United States Patent
Matsuda et al.

(10) Patent No.: US 10,234,556 B2
(45) Date of Patent: Mar. 19, 2019

(54) SIGNAL PROCESSING DEVICE AND SIGNAL PROCESSING METHOD IN WIND PROFILER

(71) Applicant: Mitsubishi Electric Corporation, Tokyo (JP)

(72) Inventors: Tomoya Matsuda, Tokyo (JP); Taiji Harada, Tokyo (JP); Takao Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 451 days.

(21) Appl. No.: 14/420,498

(22) PCT Filed: Jul. 16, 2013

(86) PCT No.: PCT/JP2013/069274
§ 371 (c)(1),
(2) Date: Feb. 9, 2015

(87) PCT Pub. No.: WO2014/024644
PCT Pub. Date: Feb. 13, 2014

(65) Prior Publication Data
US 2015/0226849 A1  Aug. 13, 2015

(30) Foreign Application Priority Data

Aug. 9, 2012  (JP) ................. 2012-176756

(51) Int. Cl.
*G01S 13/95* (2006.01)
*G01S 7/41* (2006.01)
(Continued)

(52) U.S. Cl.
CPC ............. *G01S 13/95* (2013.01); *G01S 7/28* (2013.01); *G01S 7/292* (2013.01); *G01S 7/41* (2013.01);
(Continued)

(58) Field of Classification Search
None
See application file for complete search history.

(56) References Cited

U.S. PATENT DOCUMENTS

| | | | |
|---|---|---|---|
| 2004/0041725 A1* | 3/2004 | Matsuda | G01S 13/951 342/26 R |
| 2009/0009390 A1 | 1/2009 | Lee et al. | |
| 2013/0278458 A1 | 10/2013 | Mitsugi et al. | |

FOREIGN PATENT DOCUMENTS

| | | |
|---|---|---|
| JP | 54-41179 U | 3/1979 |
| JP | 10 148671 | 6/1998 |

(Continued)

OTHER PUBLICATIONS

Extended European Search Report dated Mar. 17, 2016 in European Patent Application No. 13828328.8.
(Continued)

*Primary Examiner* — Tom Thomas
*Assistant Examiner* — Steven B Gauthier
(74) *Attorney, Agent, or Firm* — Oblon, McClelland, Maier & Neustadt, L.L.P.

(57) ABSTRACT

In a wind profiler, the number of acquisition ranges is expanded up to heights where noise is introduced into a received signal, even in the case where noise due to transmit/receive switching is introduced. A signal processing device in a wind profiler emits an electromagnetic wave pulse into a space, switches from transmitting to receiving, receives an electromagnetic wave reflected from a target to be observed, and measures wind speed from a Doppler frequency of the received electromagnetic wave, and includes an unnecessary data determiner that detects a noise section in which switching noise occurs due to the switching between transmitting and receiving, and an unnecessary data eraser that converts a received signal in the noise section to substantially insignificant data.

7 Claims, 13 Drawing Sheets

(51) Int. Cl.
  *G01S 13/28* (2006.01)
  *G01S 13/58* (2006.01)
  *G01S 7/292* (2006.01)
  *G01S 7/28* (2006.01)
(52) U.S. Cl.
  CPC .......... *G01S 13/288* (2013.01); *G01S 13/581* (2013.01); *Y02A 90/18* (2018.01)

(56) References Cited

FOREIGN PATENT DOCUMENTS

| | | |
|---|---|---|
| JP | 2001 159636 | 6/2001 |
| JP | 2002 168948 | 6/2002 |
| JP | 2005-55302 A | 3/2005 |
| JP | 3626089 | 3/2005 |
| JP | 2006-133203 A | 5/2006 |
| JP | 2012 78119 | 4/2012 |

OTHER PUBLICATIONS

Office Action dated Jan. 5, 2015 in Pakistan Patent Application No. 535/2013.
International Search Report dated Aug. 27, 2013 in PCT/JP13/069274 Filed Jul. 16, 2013.
Office Action dated Jun. 20, 2017 in Japanese Patent Application No. 2016-170721 (with partial English translation).

* cited by examiner

SIGNAL PROCESSING DEVICE AND SIGNAL PROCESSING METHOD IN WIND PROFILER

TECHNICAL FIELD

The present disclosure relates to a signal processing device and a signal processing method in a wind profiler that measures an atmospheric wind speed distribution.

BACKGROUND ART

Recently, technology called a wind profiler that measures atmospheric wind direction and wind speed by atmosphere radar is becoming established. With a wind profiler, measuring atmospheric wind direction and wind speed at one-minute to several-minute intervals becomes possible. Atmospheric wind information measured with such high time resolution is useful for improving the accuracy of weather forecasting.

Regarding wind profilers, Patent Literature 1, for example, discloses technology that improves the accuracy of computing wind vectors. The wind profiler in Patent Literature 1 computes Doppler speeds for individual beams and for individual heights from complex received signals, and checks the coherence among the Doppler speeds computed from beams at each height. The wind profiler then selects a combination of beams at each height in order to compute a wind vector on the basis of the coherence among beams, and computes a wind vector for each height using the selected beam combination and the Doppler speed at each height.

Patent Literature 2 discloses a wind profiler signal processing technology that improves the data acquisition rate over a wide height range. In a signal processing device of Patent Literature 2, an optimal incoherent integration time is set for individual heights. A power spectrum is then computed from Fourier-transformed data, and time-integrated for the set incoherent integration time. Additionally, Doppler speeds computed from the incoherent integrated power spectrum are time-averaged, with the low-quality Doppler speed data excluded.

CITATION LIST

Patent Literature

Patent Literature 1: Unexamined Japanese Patent Application Kokai Publication No. 2001-159636
Patent Literature 2: Unexamined Japanese Patent Application Kokai Publication No. 2002-168948

SUMMARY OF INVENTION

Technical Problem

With a wind profiler which is one type of weather radar and which computes wind direction and wind speed from the ground up into the atmosphere, when switching noise that occurs at switching between transmitting and receiving is introduced into data at the stage of pulse compression processing, there is a problem in that accurate Doppler speeds cannot be computed.

In the related art, in order to process only data within ranges unaffected by switching noise, the number of data acquisition ranges is reduced and the effects of noise is avoided. In this case, however, the range of acquirable data to process becomes less than the observable range.

The present disclosure has been devised in order to solve problems like the above, and takes as an object to expand the number of acquisition ranges in a wind profiler up to heights where noise is introduced into the received signal, even in the case where noise due to transmit/receive switching is introduced.

Solution to Problem

In order to achieve the above object, a signal processing device according to an aspect of the present disclosure is a signal processing device in a wind profiler that emits an electromagnetic wave pulse into a space, switches from transmitting to receiving, receives an electromagnetic wave reflected from a target to be observed, and measures wind speed from a Doppler frequency of the received electromagnetic wave, and is equipped with a detector that detects a noise section in which switching noise occurs due to the switching between transmitting and receiving, and a signal suppressor that converts a received signal in the noise section to substantially insignificant data.

Advantageous Effects of Invention

According to the present disclosure, converting a received signal in a noise section where switching noise occurs into substantially insignificant data enables expansion of the number of acquisition ranges up to heights where noise is introduced into the received signal.

DESCRIPTION OF EMBODIMENTS

Figure 1:
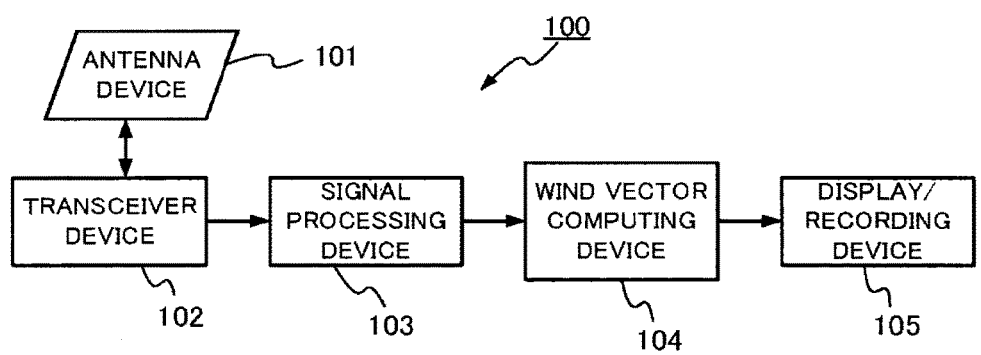
FIG. 1 is a block diagram illustrating a whole configuration of a wind profiler according to an embodiment of the present disclosure.

FIG. 1 is a block diagram illustrating a whole configuration of a wind profiler according to an embodiment of the present disclosure. The wind profiler 100 is one type of Doppler radar, and as illustrated in FIG. 1, includes an antenna device 101, a transceiver device 102, a signal processing device 103, a wind vector computing device 104, and a display/recording device 105. In a wind profiler 100 configured in this way, the antenna device 101 emits electromagnetic waves into the air and receives reflected waves. The received electromagnetic waves are amplified and frequency-converted by the transceiver device 102, and converted into a received intermediate-frequency (IF) signal. The signal processing device 103 computes spectral data by conducting analog-to-digital (A-D) conversion and frequency analysis processing on the IF signal, and delivers the computed spectral data to the wind vector computing device 104. The wind vector computing device 104 computes Doppler speeds from the spectral data, and then computes wind vectors. The wind vectors thus computed are displayed or recorded by the display/recording device 105.

Figure 2:
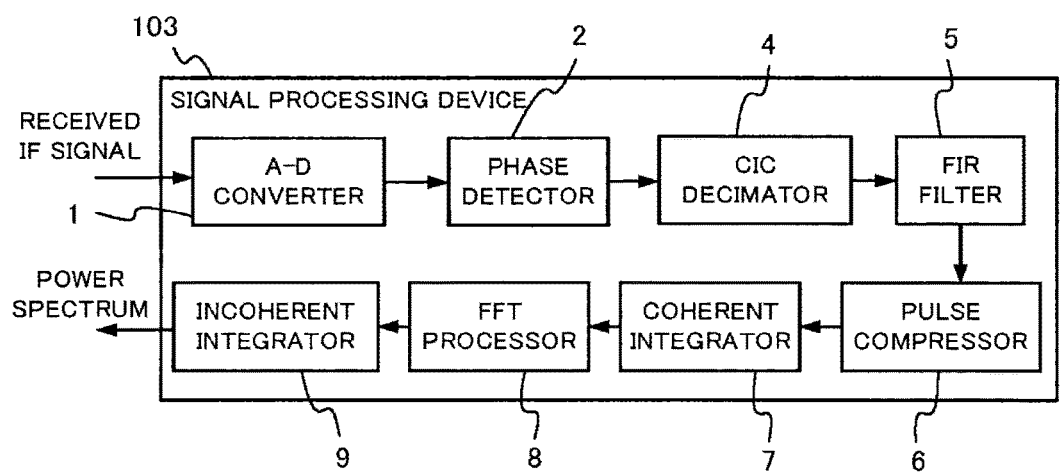
FIG. 2 is a block diagram explaining the principle of a signal processing device in a wind profiler.

FIG. 2 is a block diagram explaining the principle of a signal processing device in a wind profiler. The signal processing device 103 includes an A-D converter 1, a phase detector 2, a CIC decimator 4, an FIR filter 5, a pulse compressor 6, a coherent integrator 7, an FFT processor 8, and an incoherent integrator 9, for example. Hereinafter, conceptual operation of the signal processing device is described.

A received IF signal output from the transceiver device 102 of FIG. 1 is input into the A-D converter 1. At the A-D converter 1, the received IF signal is converted from an analog signal to a digital signal. This digital signal is input into the phase detector 2, the phase is detected by complex multiplication of sine/cosine signals, and I/Q signals are generated. The I/Q signals are input into the CIC decimator 4 and thinned by a cascaded integration comb (CIC) filter. The thinned I/Q data are input into the FIR filter 5, and the amplitude characteristics of the CIC-filtered I/Q data are corrected.

The pulse compressor 6 performs pulse compression demodulation to the I/Q data with corrected amplitude characteristics. The demodulated I/Q data are coherently integrated by the coherent integrator 7 and are Fourier transformed by the FFT processor 8, and are input into the incoherent integrator 9. At the incoherent integrator 9, a power spectrum obtained by computing power values with the Fourier transform of the received signal data is computed, and then the power spectrum obtained at a plurality of time points is accumulated (incoherent integration), and output as the (accumulated) power spectrum.

Figure 3:
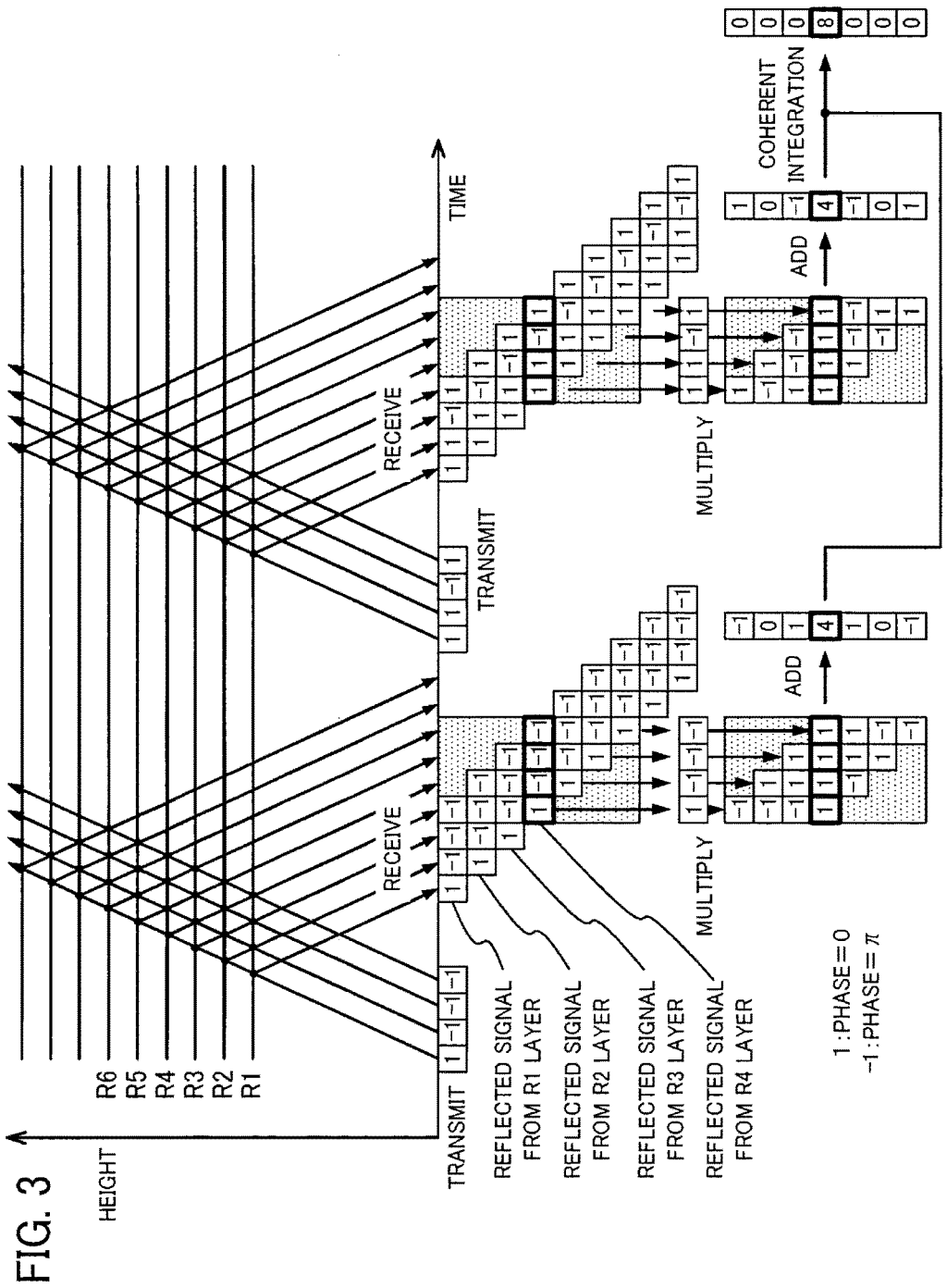
FIG. 3 is a diagram for explaining the principle of pulse compression in a wind profiler.

The principle of pulse compression in a wind profiler is described. FIG. 3 is a diagram for explaining the principle of pulse compression in a wind profiler. FIG. 3 illustrates the principle of 4-bit pulse compression using Spano codes. FIG. 3 illustrates the case of decoding (pulse compression demodulation) of a signal reflected from the R4 layer. The transmit values "1" and "−1" represent signals with phases of 0 and π, respectively. If the received signal at the time of receiving a transmit pulse reflected from the R4 layer is multiplied by the transmitted bit pattern and added in the time direction, only the data reflected from the R4 layer is accumulated to an amount equal to the bit length (in FIG. 3, four bits). If the integral is taken for a plurality of coherent pulses transmitted while changing the bit pattern, the reflected signal from the R4 layer is multiplied several times, while other signals are canceled out. In the example in FIG. 3, an 8 times the strength of the received signal is obtained by the effects of two coherent integrations on 4-bit pulse compression. Meanwhile, the reflected signals from other layers are canceled out and become 0.

In principle, even around transmit/receive switching, the portion of a signal necessary for decoding has already been received before transmit/receive switching, and thus decoding, although incomplete, is possible. However, since noise due to transmit/receive switching is introduced into the data to be decoded, the noise appears in the spectral data, and a Doppler speed that differs from a real echo is computed.

Figure 4:
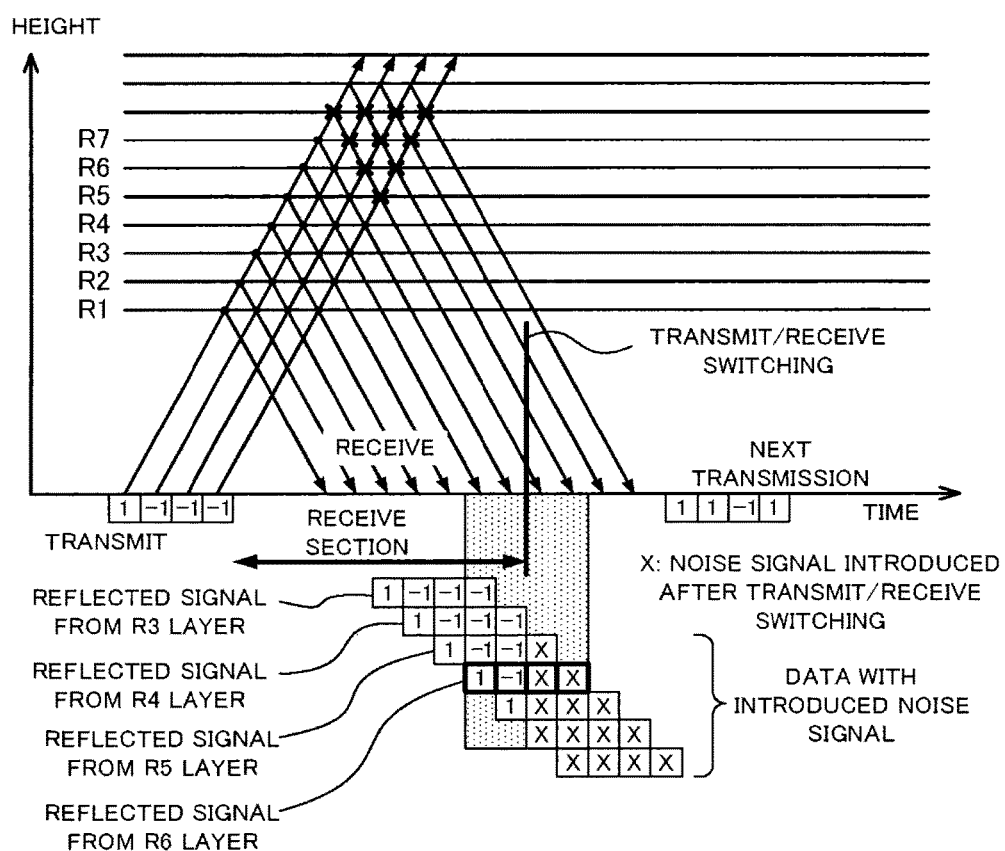
FIG. 4 is a diagram for explaining the effects of switching noise on the pulse compression when switching from receiving to transmitting.
Figure 5:
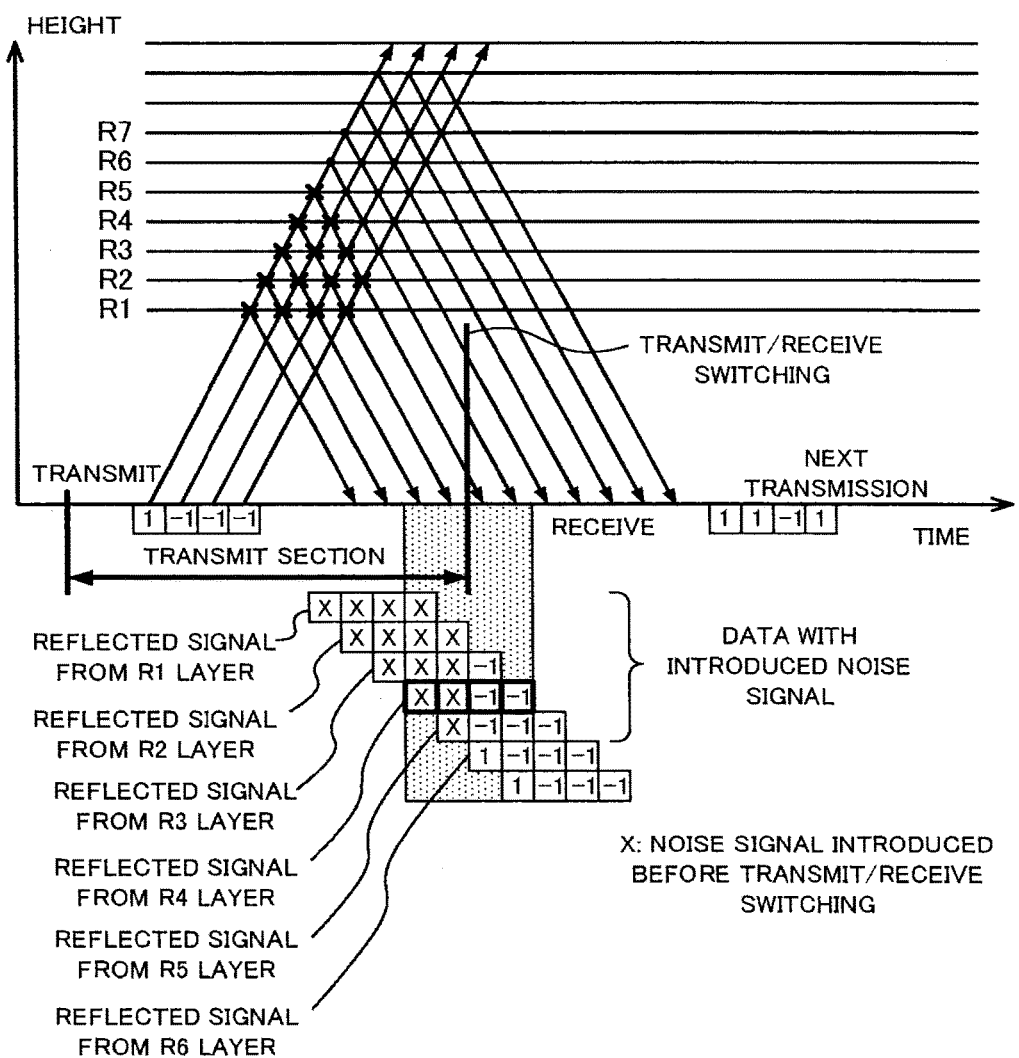
FIG. 5 is a diagram for explaining the effects of switching noise on the pulse compression when switching from transmitting to receiving.
Figure 6:
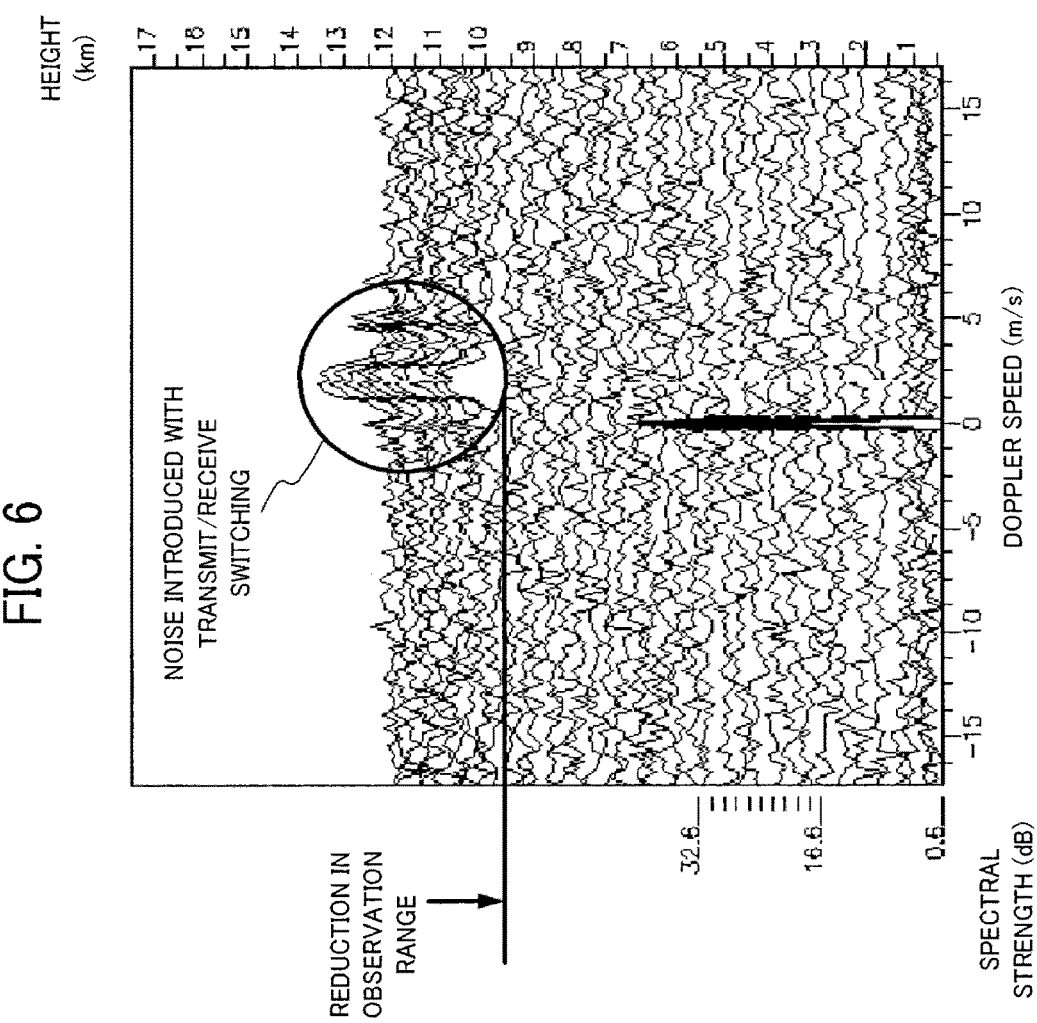
FIG. 6 is a diagram illustrating an example of noise due to the effects of transmit/receive switching near a maximum observation layer.

FIG. 4 is a diagram for explaining the effects of switching noise on the pulse compression when switching from receiving to transmitting. FIG. 5 is a diagram for explaining the effects of switching noise on the pulse compression when switching from transmitting to receiving. In the example in FIG. 4, a switch from receiving to transmitting is conducted immediately after receiving the last bit of a transmitted signal reflected from the R4 layer. For this reason, noise is introduced into the received signals reflected from layers above the R4 layer. Meanwhile, in the example in FIG. 5, a switch from transmitting to receiving is conducted slightly before receiving the first bit of a transmitted signal reflected from the R6 layer. For this reason, noise is introduced into the received signals reflected from layers below the R6 layer. FIG. 6 is a diagram illustrating an example of noise due to the effects of transmit/receive switching near a maximum observation layer.

The observable range is narrowed, if the number of ranges to acquire is restricted by removing the reflected waves from layers where noise is introduced into the received signals and process only the unaffected ranges in order to avoid the effects of noise. For example, in FIG. 4, the observable range is narrowed to the R4 layer and below. Also, in the example in FIG. 5, the observable range is restricted at heights in the R6 layer and above. The spectrum in FIG. 6 shows that observations cannot be made at heights at or above 10 km.

Embodiment 1

Figure 7:
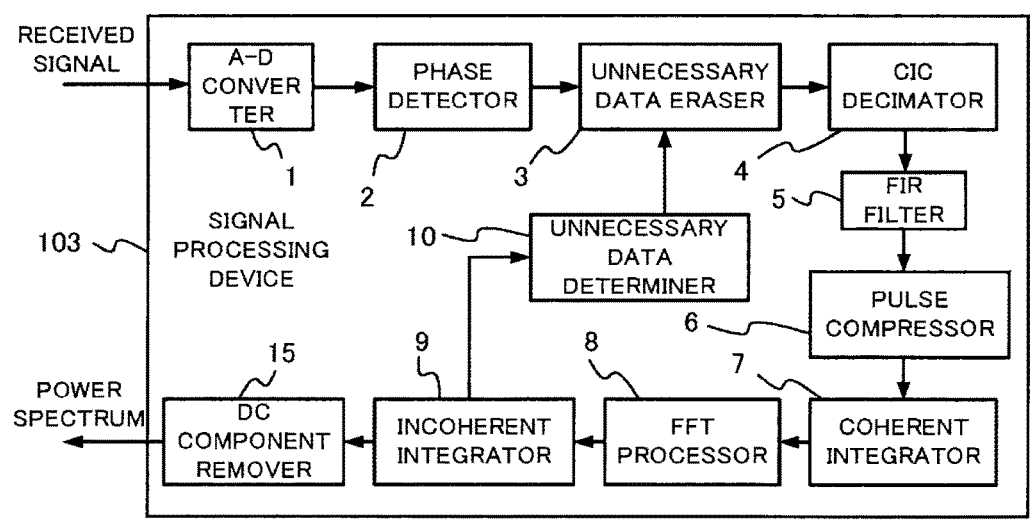
FIG. 7 is a block diagram illustrating an exemplary configuration of a signal processing device according to Embodiment 1 of the present disclosure.

FIG. 7 is a block diagram illustrating an exemplary configuration of a signal processing device according to Embodiment 1 of the present disclosure. The signal processing device 103 illustrated in FIG. 7 is equivalent to the signal processing device 103 of the wind profiler 100 illustrated in FIG. 1. In addition to the principle configuration illustrated in FIG. 2, a signal processing device 103 according to Embodiment 1 is equipped with an unnecessary data eraser 3, an unnecessary data determiner 10, and a DC component remover 15.

The unnecessary data determiner 10 determines the presence of noise introduced during transmit/receive switching for a power spectrum output from the incoherent integrator 9, and detects a noise section. The unnecessary data determiner 10 sets a replacing section matched to the noise section. The replacing section is a section of a received signal that should be substantially insignificant (unnecessary data should be erased). The unnecessary data determiner 10 delivers a signal indicating a replacing section to the unnecessary data eraser 3. The unnecessary data eraser 3, following a signal indicating a replacing section, replaces the data in the replacing section with respect to the I/Q data output from the phase detector 2 with substantially insignificant data. Namely, data in the replacing section is replaced with a fixed value, such as "0", for example. The DC component remover 15 removes the DC component that prominently appears as a result of erasing unnecessary data in a power spectrum output from the incoherent integrator 9. Hereinafter, detailed processing operations of the unnecessary data eraser 3 and the unnecessary data determiner 10 are described.

Figure 8:
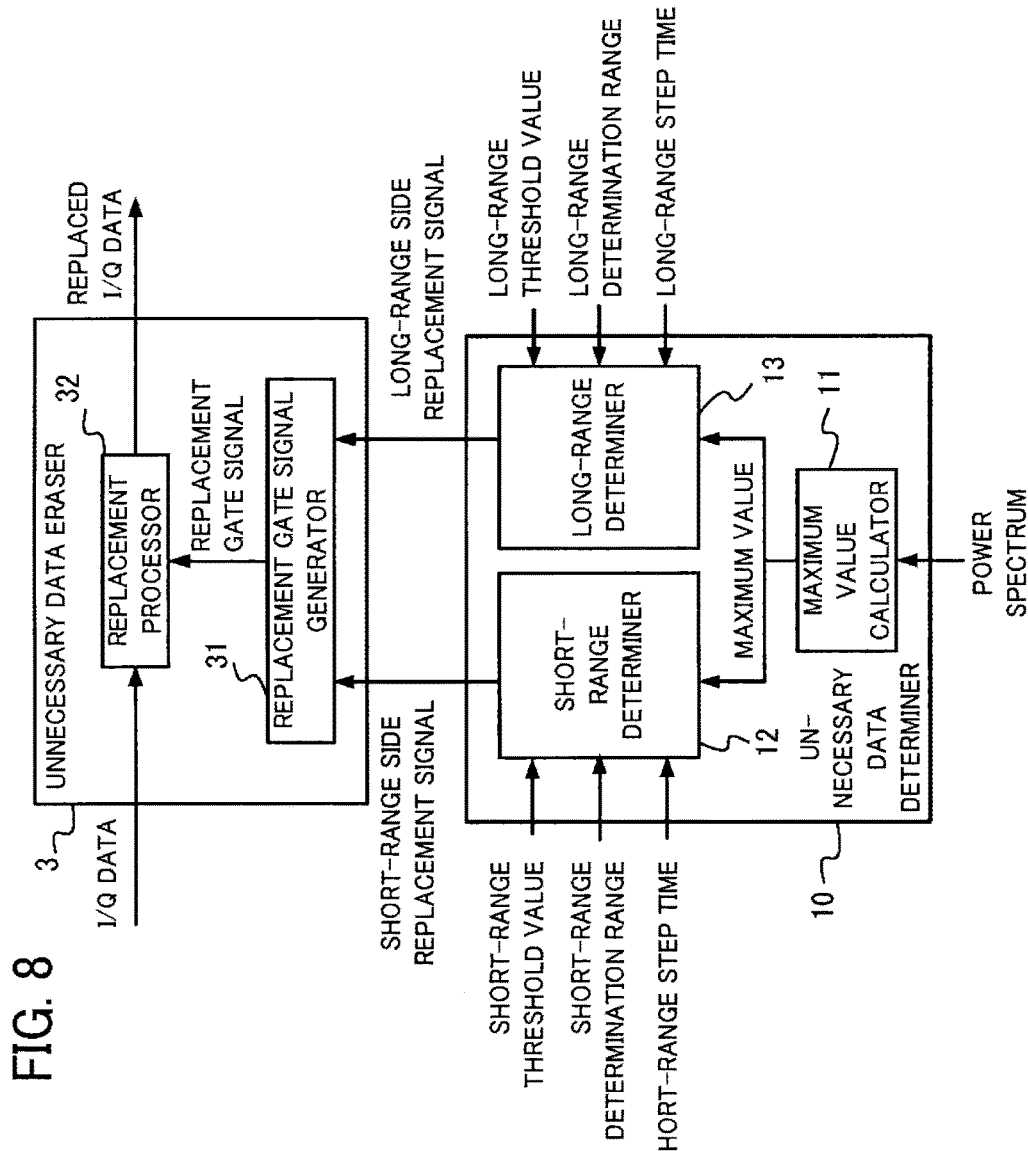
FIG. 8 is a block diagram illustrating a configuration of an unnecessary data determiner and an unnecessary data eraser according to Embodiment 1.

FIG. 8 is a block diagram illustrating a configuration of an unnecessary data determiner and an unnecessary data eraser according to Embodiment 1. The unnecessary data determiner 10 includes a maximum value calculator 11, a short-range determiner 12, and a long-range determiner 13. The unnecessary data eraser 3 includes a replacement gate signal generator 31 and a replacement processor 32.

The maximum value calculator 11 of the unnecessary data determiner 10 calculates a maximum value for individual heights (distances from the wind profiler 100) in a power spectrum input from the incoherent integrator 9. The maximum value calculator 11 outputs the calculated maximum values to the short-range determiner 12 and the long-range determiner 13.

The short-range determiner 12 detects a noise section in a received signal reflected from a layer close to the wind profiler 100, or in other words a range of the received signal that should be substantially insignificant (a replacing section) due to noise produced by switching from transmitting to receiving. The long-range determiner 13 detects a noise section in a received signal reflected from a layer far from the wind profiler 100, or in other words a range of the received signal that should be substantially insignificant (a replacing section) due to noise produced by switching from receiving to transmitting.

Although not illustrated in FIGS. 7 and 8, a signal that conducts switching between receiving and transmitting is input into the signal processing device 103 from the transceiver device 102. Alternatively, the signal processing device 103 generates and issues to the transceiver device 102 a command for switching between receiving and transmitting. In either case, the unnecessary data determiner 10 knows the timing of transmit/receive switching.

The short-range determiner 12 sets a replacing section for a received signal reflected from a close layer where noise occurs due to switching from transmitting to receiving. The short-range determiner 12, on the basis of the switching timing from transmitting to receiving, extends the replacing section in a direction from the transmit section to the receive section (toward a later time) until the maximum value of the (close layer) power spectrum falls to or below a threshold value. For example, in the case where the maximum value of a power spectrum exceeds a threshold value, the short-range determiner 12 extends the replacing section by a fixed step in time, and examines the change in the maximum value of the power spectrum. This operation is repeated until the maximum value falls to or below the threshold value.

The long-range determiner 13 sets a replacing section for a received signal reflected from a far layer where noise occurs due to switching from receiving to transmitting. The long-range determiner 13, on the basis of the switching timing from receiving to transmitting, extends the replacing section in a direction from a transmit section to a receive section preceding the transmit section (toward an earlier time) until the maximum value of the (far layer) power spectrum falls to or below a threshold value. For example, in the case where the maximum value of a power spectrum exceeds a threshold value, the long-range determiner 13 extends the replacing section backwards by a fixed step in time, and examines the change in the maximum value of the power spectrum. This operation is repeated until the maximum value falls to or below the threshold value.

Since the heights affected by noise on the short-range side and the heights affected by noise on the long-range side are known according to the transmit/receive switch timing (see FIGS. 4 and 5), it is possible to determine the ranges of the heights to be determined respectively. The short-range determiner 12 and the long-range determiner 13 set noise sections in the ranges of the respective heights. Also, the short-range determiner 12 determines an end point for a replacing section in a time range (determination range) following the switch timing from transmitting to receiving. Additionally, the long-range determiner 13 determines a start point for a replacing section in a time range (determination range) preceding the switch timing from receiving to transmitting.

Figure 9A:
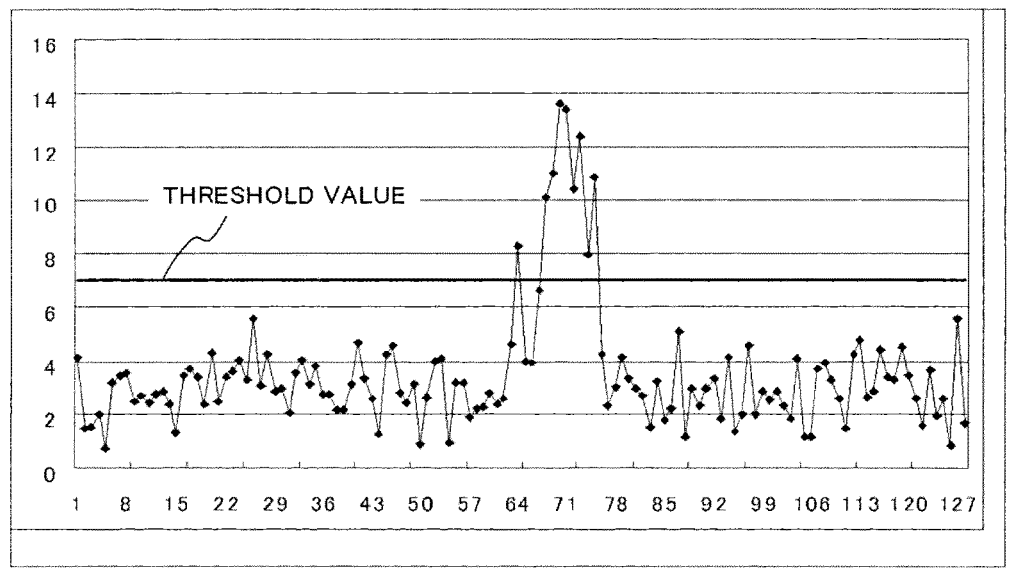
FIG. 9A is a diagram illustrating an example of a power spectrum for unnecessary data determination according to Embodiment 1.
Figure 9B:
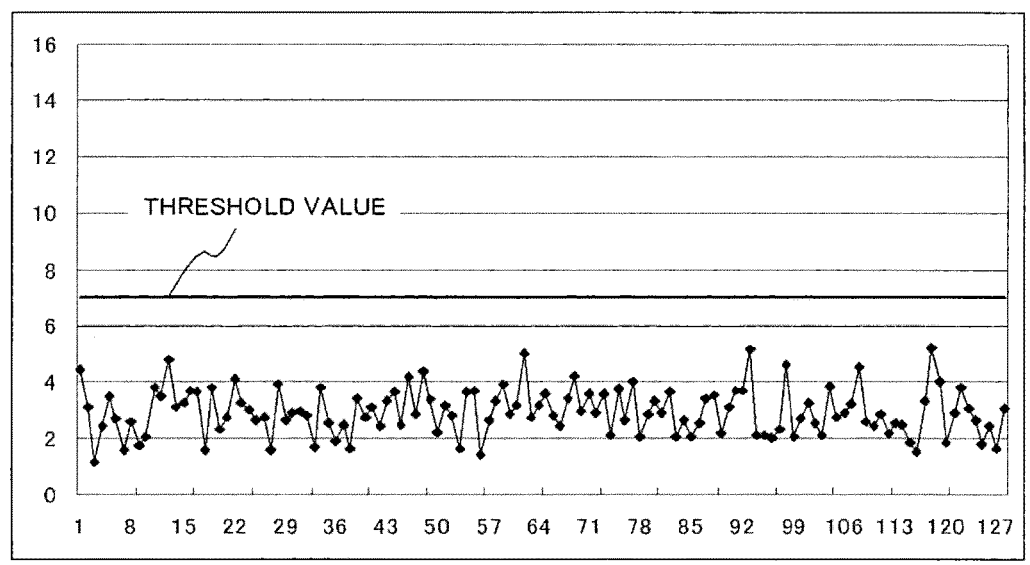
FIG. 9B is a diagram illustrating an example of a power spectrum for unnecessary data determination according to Embodiment 1.

FIGS. 9A and 9B are diagrams illustrating examples of power spectra for unnecessary data determination according to Embodiment 1. FIGS. 9A and 9B express power spectra of a received signal reflected from a given height. FIG. 9A illustrates the case where the maximum value exceeds a threshold value, while FIG. 9B illustrates the case where the maximum value is at or below the threshold value. The short-range determiner 12 and the long-range determiner 13 extend the replacing section until the maximum values in the power spectra of the respectively targeted heights fall to or below the threshold value.

The short-range determiner 12 and the long-range determiner 13 compute a replacing section, as a noise section, in which data in a received signal is replaced with a fixed value (positions where I/Q data are replaced with a fixed value) on the basis of information on the maximum value of a power spectrum, a determination threshold value, a determination range, and a step time, and output replacement signals (a short-range replacement signal and a long-range replacement signal). Herein, the process flow is the same, with the short-range determiner 12 and the long-range determiner 13 differing only in the threshold values, determination ranges, and step times that are set (for short-range and for long-range). Provided that the direction to later time is positive, if the step time is set to a positive value for short-range and a negative value for long-range, the same algorithm can be used for short-range and long-range.

Figure 10:
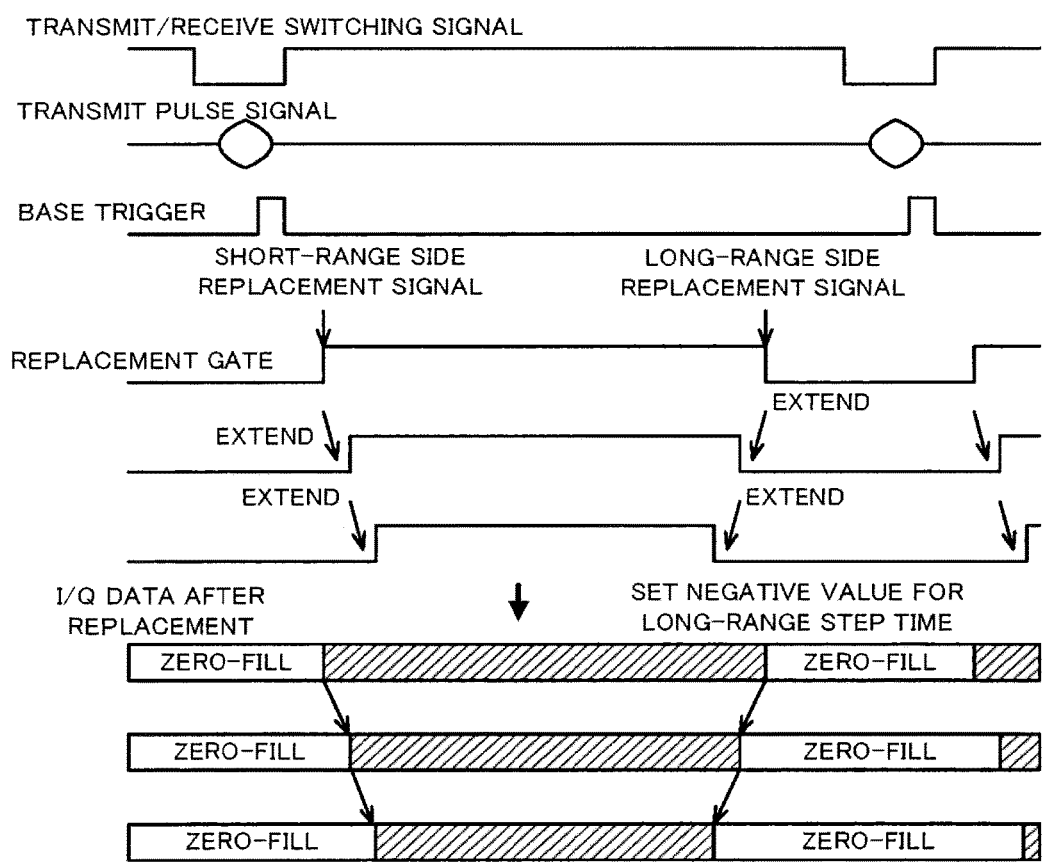
FIG. 10 is a timing chart illustrating unnecessary data determination and deletion operations according to Embodiment 1.

FIG. 10 is a timing chart illustrating unnecessary data determination and deletion operations according to Embodiment 1. The transmit/receive switch signal indicates transmission at low level, and reception at high level. The transmit pulse signal appears in transmit sections. The base trigger indicates the switch timing from transmitting to receiving, and is the basis for setting noise sections (replacing sections). The short-range determiner 12 extends a replacing section later than the base trigger (in the direction of advancing time). The long-range determiner 13 extends a replacing section before than the base trigger (in the direction of backwards time). FIG. 10 illustrates how the presence of noise is determined in single time intervals, and how a replacing section is extended in order of time interval by setting a replacing section in the next time interval.

The replacement gate signal generator 31 in FIG. 8 generates a replacement gate signal using a short-range replacement signal and a long-range replacement signal input from the short-range determiner 12 and the long-range determiner 13. In the replacement gate signal, the interval from a long-range replacement signal to the next short-range replacement signal is a replacing section. In FIG. 10, the low level of the replacement gate signal indicates a replacing section.

In the replacement processor 32, I/Q data input from the phase detector 2 is replaced with a fixed value, such as the data "0", for example, only while a gate is applied according to a replacement gate signal input from the replacement gate signal generator 31. The replacement data is not limited to "0", and may be any fixed value. FIG. 10 illustrates how received signal data of a replacing section in a time interval after a time interval where noise is determined to be present is replaced with "0" (a fixed value), with the replacing section being enlarged in successive time intervals.

Figure 11:
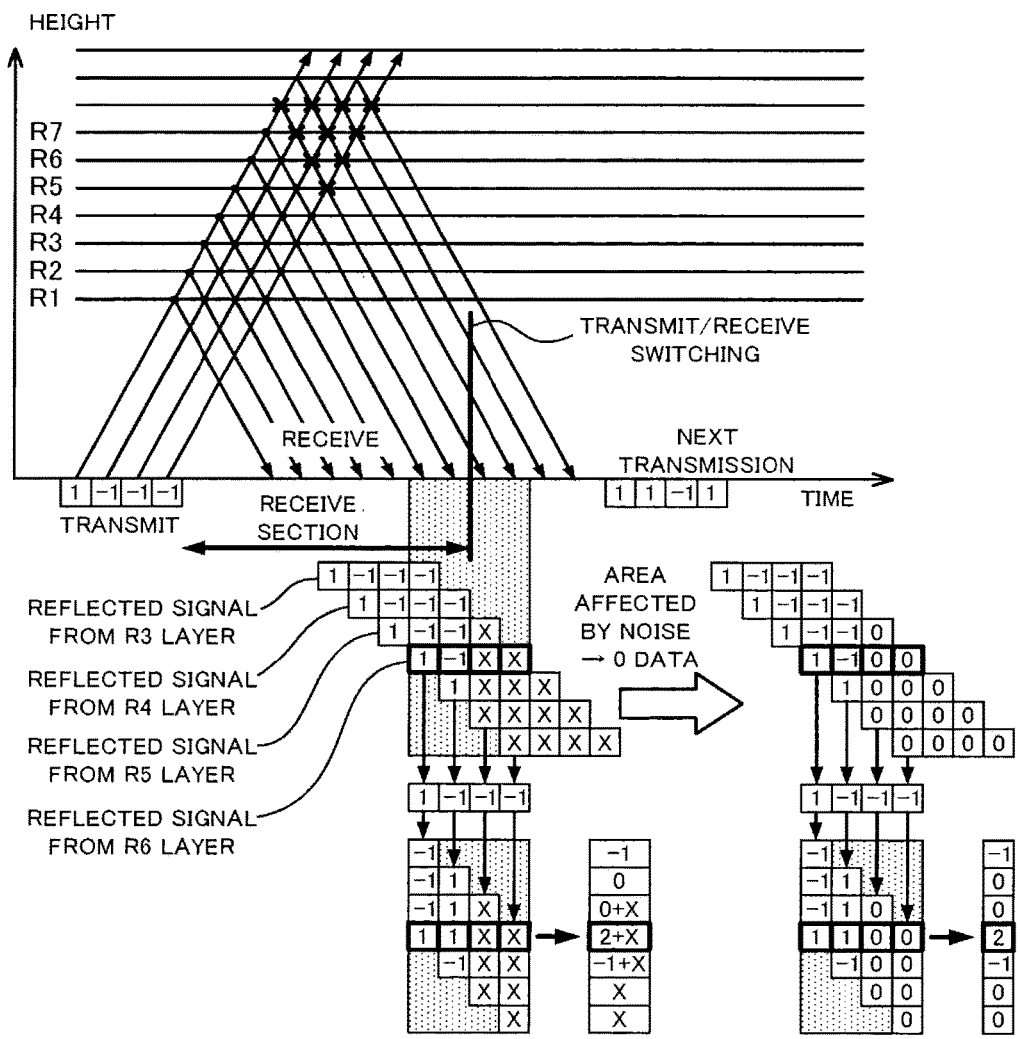
FIG. 11 is a diagram for explaining how noise effects are potentially reduced by noise section determination and replacement in Embodiment 1.

FIG. 11 is a diagram for explaining how noise effects are potentially reduced by noise section determination and replacement in Embodiment 1. The left side of FIG. 11 is the same as FIG. 4. "1" and "−1" represent signals with phases of 0 and π, respectively. "0" represents a fixed value with an amplitude of 0, and not a phase of π/2 (or −π/2). By replacing a signal affected by noise represented by being marked with "X" with the fixed value "0", noise is not included in the pulse-compressed data of the R6 layer, for example, enabling correct computation of Doppler speed in the R6 layer. By replacing data including noise caused by transmit/receive switching with 0, only an atmospheric echo appears in the demodulated spectral data, as illustrated in FIG. 11.

A layer with replaced data, such as the R6 layer, for example, is compressed with fewer accumulations, and thus the precision is reduced compared to the R4 layer in which data is not replaced, but lengthening the incoherent integration time compensates for this reduction. In layers at high heights, wind speed changes over time are small and low time resolution is acceptable, and thus this configuration readily stands up to actual use.

By conducting the replacement process discussed above, discontinuities at the boundaries between real data and replacement data introduce a DC component into the spectral data. Accordingly, the DC component remover 15 in FIG. 7 deletes the DC component (the point of Doppler 0). For example, the DC component is removed by interpolating from adjacent data into the DC component of the power spectrum, thereby resolving problems caused by data discontinuity.

Figure 12A:
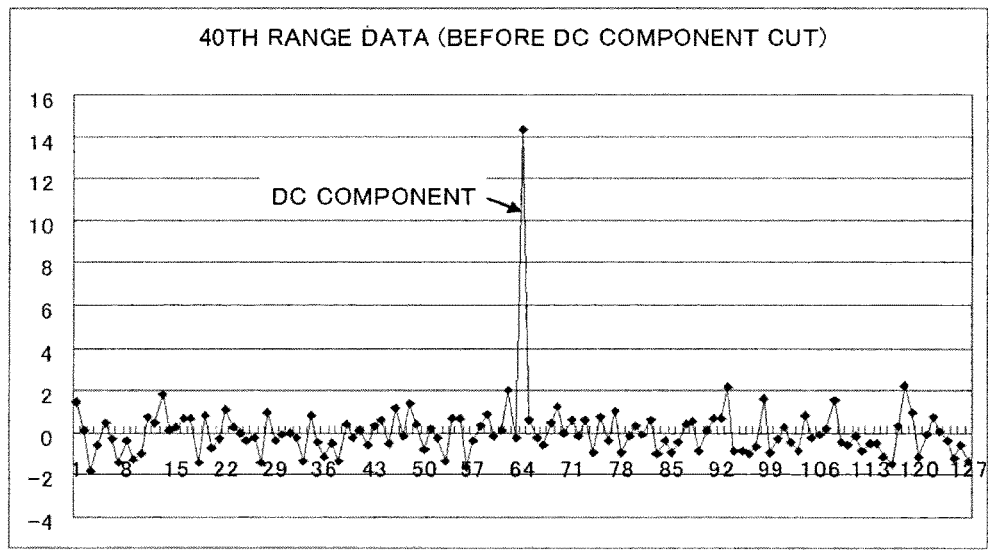
FIG. 12A is a diagram illustrating an example of a power spectrum before removing the DC component according to Embodiment 1.
Figure 12B:
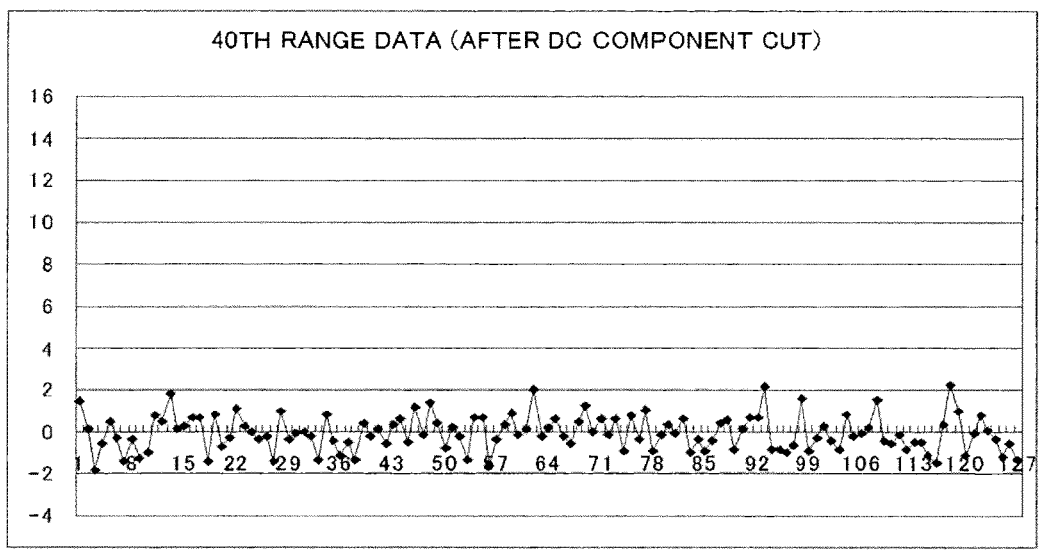
FIG. 12B is a diagram illustrating an example of a power spectrum after removing the DC component according to Embodiment 1.

FIG. 12A is a diagram illustrating a power spectrum before removing the DC component according to Embodiment 1. FIG. 12B is a diagram illustrating a power spectrum after removing the DC component according to Embodiment 1.

Figure 13:
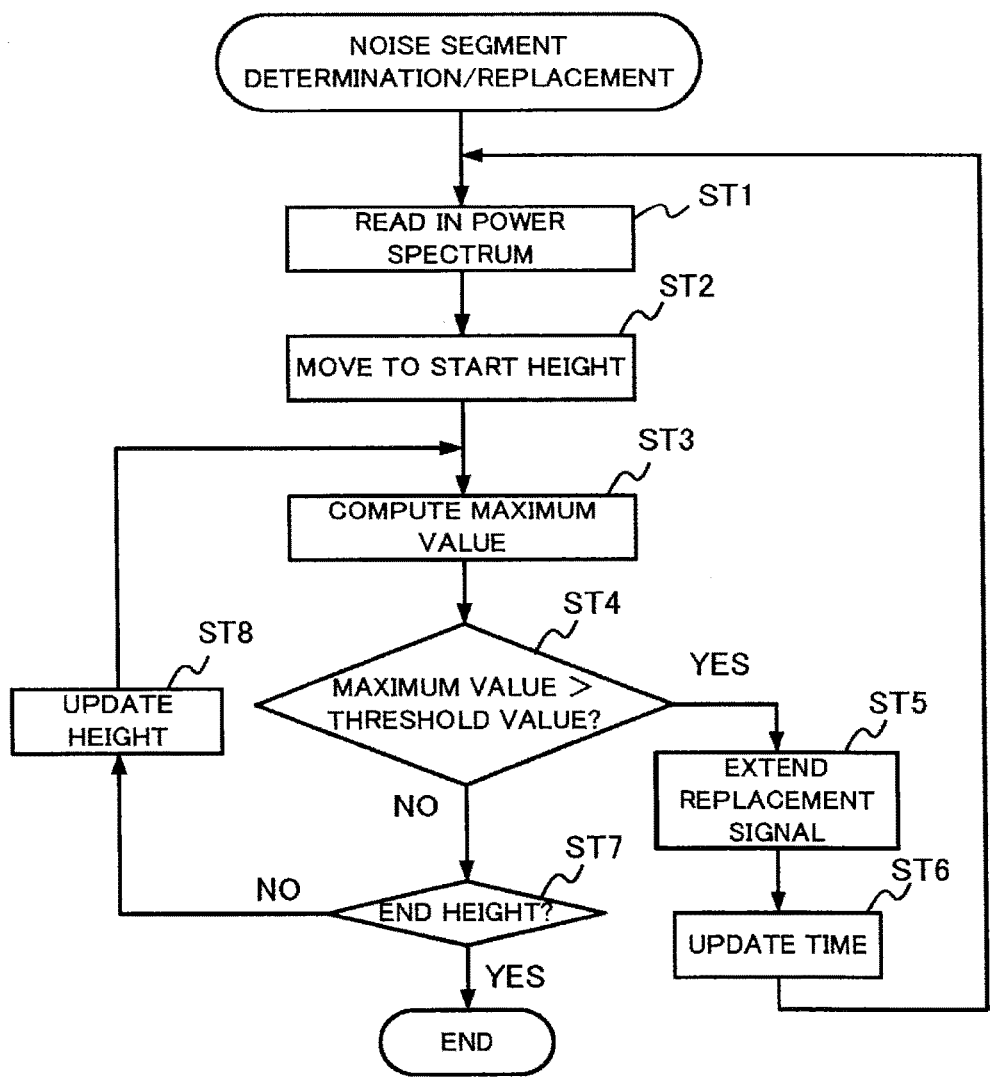
FIG. 13 is a flowchart illustrating an example of noise section determination and replacement operations according to Embodiment 1.

FIG. 13 is a flowchart illustrating an example of noise section determination and replacement operations according to Embodiment 1. As discussed above, the determination processes are realized with the same method by individually setting noise section determination threshold values, determination ranges, and step times for the short-range side (the timings for switching from transmitting to receiving) and the long-range side (the timings for switching from receiving to transmitting).

First, the unnecessary data determiner 10 reads in power spectra from the incoherent integrator 9 (step ST1). From among the input power spectra, the unnecessary data determiner 10 chooses the power spectrum of a first height in a range to be determined (sets a height to determine) (step ST2). Next, the maximum value calculator 11 computes the maximum value of the power spectrum at the height that was chosen (step ST3).

The short-range determiner 12 or the long-range determiner 13 compares the maximum value to a threshold value, and proceeds to a replacement signal delaying step ST5 in the case where the maximum value is greater than the threshold value (step ST4; YES), while proceeding to a last height determining step ST7 in the case where the maximum value is less than or equal to the threshold value (step ST4; NO). As discussed above, short-range or long-range is selected according to the height to be determined. For example, the short-range determiner 12 makes determinations for heights at or below a given height, while the long-range determiner 13 makes determinations for higher heights. The threshold value that is compared with the maximum value, the time step used for extension, and the base timing (the basis for the short-range side replacement signal and the long-range side replacement signal) are changed depending on whether the determiner is short-range or long-range.

In the replacement signal delaying step ST5, the output timing of the replacement signal is extended by an amount equal to the step time set on the basis of the last replacement signal, and then the process proceeds to a time updating step ST6. As discussed above, provided that the direction to a later time is positive, the step time is set to a positive value for short-range and a negative value for long-range. In the short-range determiner 12, the short-range side replacement signal is extended in the later direction, while in the long-range determiner 13, the long-range side replacement signal is extended in the earlier direction. In the time updating step ST6, the time interval to be processed (a single transmit section and the following receive section) is advanced to the next time interval, the height to be processed is initialized, and the process returns to the data reading step ST1.

Meanwhile, in the case where the maximum value is less than or equal to the threshold value (step ST4; NO), in the last height determining step ST7, a determination is made on whether or not the height in the threshold value determining step has reached the last height (ST7). The process ends in the case where the determination result indicates that the last height has been reached (step ST7; YES), while the process proceeds to a height updating step ST8 in the case where the last height has not been reached (step ST7; NO). In the height updating step ST8, after updating the height to be processed to the next height, the process repeats from the power spectrum maximum value computation (step ST3) for that height.

As a result of conducting the noise section determination/replacement process with the unnecessary data determiner 10 and the unnecessary data eraser 3, the DC component is introduced into the power spectrum due to discontinuities at the boundaries between real data and replaced data. The DC component is removed by the DC component remover 15.

As described above, according to a signal processing device 103 in accordance with Embodiment 1, data having introduced noise caused by transmit/receive switching is replaced with a fixed value while the DC component is also removed, and thus only an atmospheric echo appears in the demodulated power spectrum. As a result, expanding the number of acquisition ranges up to heights where noise is introduced into the received signal is possible.

Embodiment 2

Figure 14:
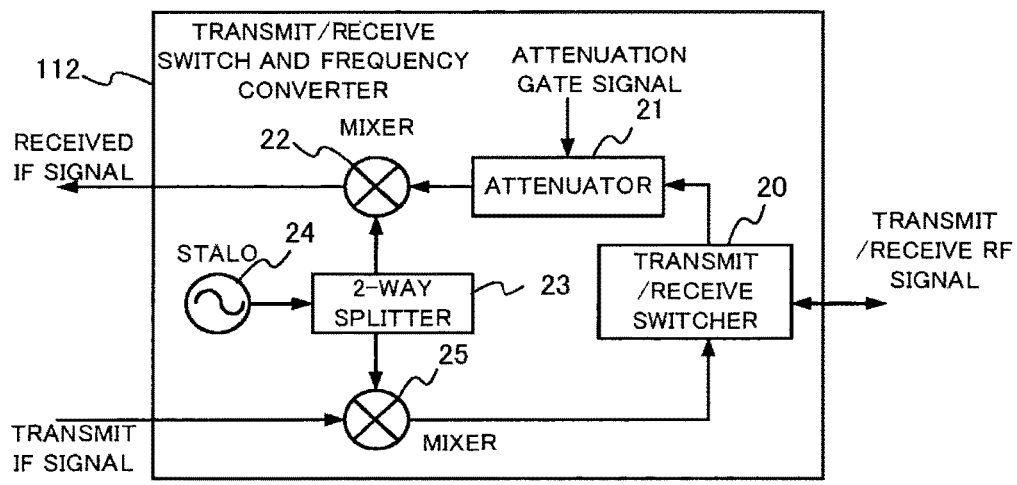
FIG. 14 is a block diagram illustrating an exemplary configuration of a transmit/receive switch and frequency converter according to Embodiment 2 of the present disclosure.

FIG. 14 is a block diagram illustrating an exemplary configuration of a transmit/receive switch and frequency converter according to Embodiment 2 of the present disclosure. Embodiment 2 shows a method that attenuates a received signal containing switching noise to a strength that is unaffected by noise (a substantially insignificant level) at the analog signal stage.

A transmit/receive switch and frequency converter 112 is equipped with a transmit/receive switcher 20, an attenuator 21, a mixer 22, a 2-way splitter 23, a stable local oscillator (STALO) 24 and a mixer 25. Although the transmit/receive switch and frequency converter 112 in FIG. 14 is included in the transceiver device 102 of FIG. 1, herein, at least the attenuator 21 is treated as part of the signal processing device 103.

A periodic signal of constant frequency generated by the STALO 24 is supplied to a transmitting side mixer 25 and a receiving side mixer 22 by the 2-way splitter 23. A transmit IF signal is upconverted to the frequency of a carrier wave by the mixer 25, and delivered to the transmit/receive switcher 20 as a transmit RF signal. The transmit/receive switcher 20 switches between transmitting and receiving in order to relay transmit RF signals to a transmitter and received RF signals to a receiver. In the case of transmitting, a transmit RF signal from the mixer 25 is delivered to the antenna device 101. In the case of receiving, a received RF signal from the antenna device 101 is delivered to the attenuator 21.

The attenuator 21 attenuates a received RF signal input by the transmit/receive switcher 20 only while an attenuation gate signal is supplied. The attenuation gate signal is supplied from the signal processing device 103.

The signal processing device 103 acquires, for example, a timing signal for switching between transmitting and receiving (the transmit/receive switch signal illustrated in FIG. 10), and generates the attenuation gate signal during a time range of given length from the timing signal that is a pre-measured range where noise occurs. Alternatively, a replacement signal of Embodiment 1 is adjusted considering the delay time from the attenuator 21 to the unnecessary data determiner 10 and is supplied as an attenuation gate signal.

The received RF signal that has been attenuated while the attenuation gate signal is supplied, is converted to an intermediate frequency by the mixer 22, and delivered to the A-D converter 1 of the signal processing device 103 as a received IF signal. Since the received IF signal while being supplied the attenuation gate signal that is where switching noise due to transmit/receive switching is introduced are attenuated to substantially insignificant levels, unnecessary peaks do not appear in the power spectrum.

Figure 15:
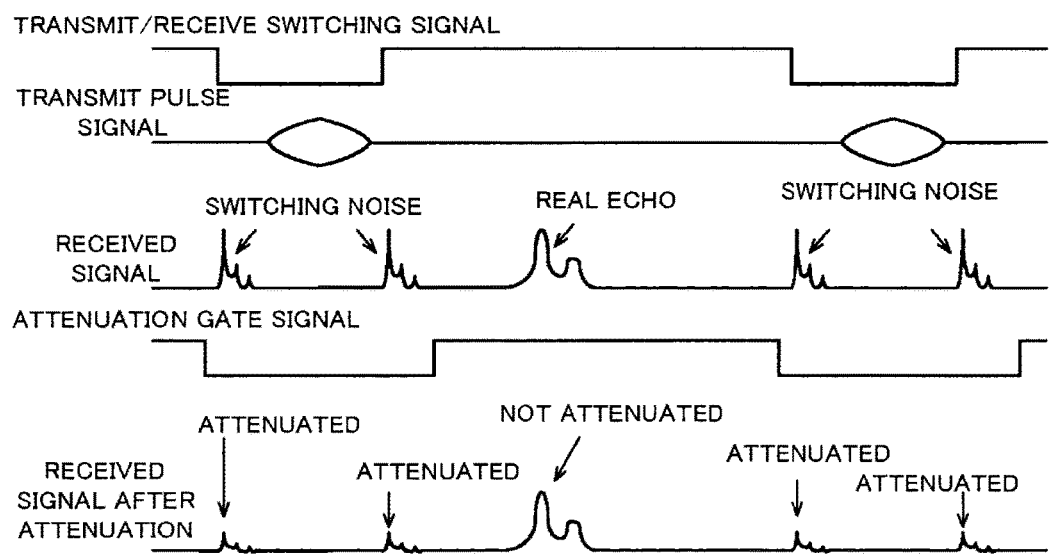
FIG. 15 is a timing chart illustrating an example of attenuating switching noise according to Embodiment 2.

FIG. 15 is a timing chart illustrating an example of attenuating switching noise according to Embodiment 2. Strong switching noise is introduced into the received signal during the rising and falling of the transmit/receive switching signal. By applying attenuation only to the signal in sections where switching noise is introduced, the switching noise is attenuated, while leaving a real echo unaffected.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims priority based on Japanese Patent Application No. 2012-176756, filed in the Japan Patent Office on Aug. 9, 2012, including specification, claims, drawings, and abstract. The disclosed contents of Japanese Patent Application No. 2012-176756 is hereby incorporated in entirety by reference.

REFERENCE SIGNS LIST

1 A-D converter
2 Phase detector
3 Unnecessary data eraser
4 CIC decimator
5 FIR filter
6 Pulse compressor
7 Coherent integrator
8 FFT processor
9 Incoherent integrator
10 Unnecessary data determiner
11 Maximum value calculator
12 Short-range determiner
13 Long-range determiner
15 DC component remover
20 Transmit/receive switcher
21 Attenuator
22 Mixer
23 2-way splitter
24 STALO
25 Mixer
31 Replacement gate signal generator
32 Replacement processor
100 Wind profiler
101 Antenna device
102 Transceiver device
103 Signal processing device
104 Wind vector computing device
105 Display/recording device
112 Transmit/receive switch and frequency converter

The invention claimed is:

1. A wind profiler that emits an electromagnetic wave pulse into a space, switches between transmitting and receiving, receives an electromagnetic wave reflected from a target to be observed, and measures wind speed from a Doppler frequency of the received electromagnetic wave, comprising:

a processor programmed to perform as a Fourier transform processor that applies a Fourier transform to a received signal data to produce a Fourier-transformed signal;

the processor is further programmed to perform as an incoherent integrator that computes a power spectrum from the Fourier-transformed signal produced by the Fourier transform processor, and time-integrates the power spectrum obtained at a plurality of times during an incoherent integration time to produce a time-integrated power spectrum;

the processor is further programmed to perform as a detector that detects a noise section in the received signal data in which switching noise occurs due to the switching between transmitting and receiving by determining whether or not a noise signal is present from the time-integrated power spectrum produced by the incoherent integrator, and sets a replacing section in which at least part of the received signal data is to be replaced with a fixed value; and the processor is further programmed to perform as a signal suppressor that converts the at least part of the received signal data in the noise section to substantially insignificant data, wherein the signal suppressor includes
- an unnecessary data eraser that, on the basis of the replacing section set by the detector, replaces the received signal data in the replacing section with a fixed value, and
- a DC component remover that removes a DC component of the time-integrated power spectrum that is generated by replacing the received signal data in the replacing section with the fixed value in the unnecessary data eraser.

2. The wind profiler according to claim 1, wherein
the detector determines whether or not the noise signal is present in one time interval, and sets the replacing section in a following time interval, and
the signal suppressor replaces the received signal data in the replacing section with the fixed value in a time interval following the one time interval in which the detector determines whether or not the noise signal is present.

3. The wind profiler according to claim 1, wherein
the detector computes a maximum value in the time-integrated power spectrum, and sets the replacing section in units of a given step time according to a result of comparing the maximum value to a threshold value within a set determination range.

4. The wind profiler according to claim 3, wherein
in the case where the maximum value is greater than a first threshold value within the set determination range, the detector extends the replacing section including a timing of switching from transmitting to receiving by a first step time forwards in time, and
in the case where the maximum value is greater than a second threshold value within the set determination range, the detector extends the replacing section including a timing of switching from receiving to transmitting by a second step time backwards in time.

5. The wind profiler according to claim 1, wherein
the detector generates a replacement gate signal indicating a start and an end of the replacing section, and
the signal suppressor replaces the received signal data with the fixed value in a section specified by the replacement gate signal.

6. The wind profiler according to claim 1, wherein
the signal suppressor removes the DC component by interpolating from adjacent data into a DC component of the power spectrum.

7. A signal processing method conducted by a wind profiler that emits an electromagnetic wave pulse into a space, switches between transmitting and receiving, receives an electromagnetic wave reflected from a target to be observed, and measures wind speed from a Doppler frequency of the received electromagnetic wave, comprising:
applying a Fourier transform to received signal data to produce a Fourier-transformed signal;
computing a power spectrum from the Fourier-transformed signal, and time-integrating the power spectrum obtained at a plurality of times during an incoherent integration time to produce a time-integrated power spectrum;
detecting a noise section in the received signal data in which switching noise occurs due to the switching between transmitting and receiving by determining the presence of a noise signal from the time-integrated power spectrum for the incoherent integration time, and setting a replacing section in which at least part of the received signal data is to be replaced with a fixed value; and
suppressing a signal by converting the at least part of the received signal data in the noise section to substantially insignificant data,
wherein the signal suppressing step includes
deleting unnecessary data by replacing, on the basis of the replacing section set in the detecting step, the received signal data in the replacing section with the fixed value, and
removing a DC component of the time-integrated power spectrum that is generated due to replacing the received signal data in the replacing section with the fixed value in the unnecessary data deleting step.

* * * * *